(12) United States Patent
Ullmann et al.

(10) Patent No.: US 6,621,048 B2
(45) Date of Patent: Sep. 16, 2003

(54) METHOD FOR HEATING A WORKPIECE

(75) Inventors: Jens Ullmann, Ehrenfriedersdorf (DE); Ralf Kuschnereit, Oberkochen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 37 days.

(21) Appl. No.: 09/946,801

(22) Filed: Sep. 4, 2001

(65) Prior Publication Data

US 2002/0030042 A1 Mar. 14, 2002

(30) Foreign Application Priority Data

Sep. 13, 2000 (DE) .......................... 100 45 264

(51) Int. Cl.[7] .............................................. B23K 26/00
(52) U.S. Cl. ................... 219/121.85; 219/121.6
(58) Field of Search ................ 219/121.85, 121.6, 219/121.81, 121.83

(56) References Cited

U.S. PATENT DOCUMENTS

| | | | | | |
|---|---|---|---|---|---|
| 3,933,970 | A | * | 1/1976 | Rosette et al. | 264/320 |
| 4,038,201 | A | * | 7/1977 | Hargreaves | 252/300 |
| 4,101,331 | A | * | 7/1978 | Anderson | 106/73.1 |
| 5,649,040 | A | * | 7/1997 | Ljungqvist et al. | 385/95 |
| 6,067,931 | A | * | 5/2000 | Ghezzo et al. | 118/725 |
| 6,417,057 | B1 | * | 7/2002 | Takemura et al. | 438/308 |
| 6,442,311 | B1 | * | 8/2002 | Barbarossa et al. | 385/37 |

* cited by examiner

Primary Examiner—M. Alexandra Elve
(74) Attorney, Agent, or Firm—Welsh & Katz, Ltd.

(57) ABSTRACT

In a method for heating workpieces, in particular optical elements such as lenses, in particular lenses made from calcium fluoride material, which are optically transparent over a large IR wavelength region of up to approximately 9 μm, the heating by thermal radiation takes place in the transition region of the optical element between optical transparency and an optically absorbing region in a wavelength region from 9 to 12 μm.

14 Claims, 1 Drawing Sheet

METHOD FOR HEATING A WORKPIECE

BACKGROUND OF THE INVENTION

The invention relates to a method for heating a workpiece.

Workpieces of all types are frequently warmed up for the most varied purposes. Thus, for example, optical elements, in particular lenses, are frequently provided with coatings on their surfaces. The layer properties are the better when the coating takes place at temperatures higher than room temperature.

It is known to heat workpieces such as, for example, optical elements by means of thermal radiation with the aid of radiant heaters such as, for example, quartz lamps. The thermal radiation emission takes place in this case with the aid of the known thermal radiation devices in their main radiation region generally in a wavelength region from 0.5 to 7 $\mu$m, mostly 2 to 4 $\mu$m for known thermal radiation devices are therefore unsuitable for workpieces which absorb no radiation in this radiation region because of their material properties. This holds inter aila for optical elements which are optically transparent in a very wide IR wavelength region which exceeds the said region such as, for example, for lenses made from calcium fluoride ($CaF_2$), and which are optically transparent up to an IR wavelength region of approximately 9 $\mu$m. The absorption of the substrate material then rises from approximately 0% to approximately 100% in the region from 9 $\mu$m to approximately 12 $\mu$m. This means that radiant heaters conventionally employed, which emit the majority of their thermal radiation in the region from approximately 0.5 to 7 $\mu$m, are therefore poorly suited for heating such lenses.

Moreover, calcium fluoride is a material which is very brittle and sensitive to thermal shock and should not exhibit any large temperature gradients when being heated up and cooled down, since otherwise it is necessary to accept the possibility of material destruction. This destruction can occur, for example, owing to instances of erosion, cracks, structural changes and the like.

Irrespective of the fact that because of the optical transparency conventional thermal radiation devices are poorly suited for processing, for example coating calcium fluoride, warming up the latter is also problematical with regard to the temperature responses named above.

It is therefore the object of the present invention to create a method of the type mentioned at the beginning with the aid of which warming up by means of thermal radiation can be used even in the case of materials which it has so far been possible to heat up by means of thermal radiation only with difficulty. This holds, in particular, for optical elements which are optically transparent over a large IR wavelength region and which also react sensitively to temperature increases,

SUMMARY OF THE INVENTION

By using radiation devices which emit beams in a wavelength region of greater than approximately 9 $\mu$m, it is possible to process, for example to coat, even workpieces which absorb no radiation over a large IR wavelength region or are optically transparent. It is thereby possible for even sensitive workpieces to be heated or warmed up in a simple way to a desired temperature range.

The inventors recognized in a very advantageous way which was not obvious that it is possible to employ a laser, in particular a $CO_2$ laser, which has an operating wavelength $\lambda$ of 10.6 $\mu$m for pinpointed heating. A $CO_2$ laser has previously been used for the processing of materials such as, fox example, separation or the introduction of bores. This means that according to the invention such a laser is now being used for a completely novel application.

The inventors have surprisingly recognized that even optical elements, in particular lenses made from calcium fluoride material, which are very sensitive and optically transparent over a large IR wavelength region can be heated by means of thermal radiation when this is allowed to take place specifically not only in a region in which these absorb the thermal radiation, but in the transition region between optical transparency and the absorption of radiation. Even sensitive materials can be heated by means of this pinpointed thermal treatment without the occurrence of material damage. This is to be ascribed to the fact that it is not possible for the incident beams to be "completely" converted into heat on the surface in the transition region, but that there is still partial traversal. Local overheating, and thus the risk of material damage, is avoided in this way.

Taking account of the relatively high production costs for $CaF_2$ optical components, it is possible in this way for the material yield to be substantially increased by reducing rejects on the basis of material damage. The optimal heating regime can be determined by setting heating time and temperature gradient in a way defined by the invention. The transit times can also be reduced in this way. A further advantage consists in that owing to the exact temperature characteristic and the defined temperature conditions the subsequent coatings can be performed under optimal conditions, and so the coating also becomes better overall.

In addition to a use for lenses made from calcium fluoride material, the invention is also, of course, suitable for other workpieces made from calcium fluoride.

BRIEF DESCRIPTION OF THE DRAWINGS

Advantageous developments of the invention follow from the remaining subclaims and from the exemplary embodiment described in principle below with the aid of the drawing, in which;

DETAILED DESCRIPTION OF THE PREFERED EMBODIMENT

Figure 1:
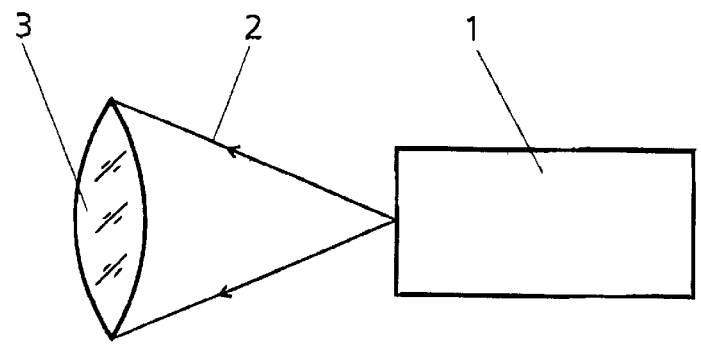
FIG. 1 shows a representation of the principle of a laser together with a lens made from calcium fluoride which is to be heated.

A $CO_2$ laser 1 which emits beams 2 with a wavelength of $\lambda$=10.6 $\mu$m is represented in principle in FIG. 1. Located in the radiation region of the laser 1 is a lens 3 made from calcium fluoride material ($CaF_2$) The $CaF_2$ lens 3 begins to absorb the beams 2 increasingly in a region from 9 $\mu$m to 12 $\mu$m. Because of the selected wavelength, only partial absorption therefore occurs, and thus there is a conversion into heat which, on the basis of the partial transparency, takes place not only on the surface, but also on the "path" of the beams 2 through the lens 3. The result of this is a gradual and controlled warming up of the lens 3 to, for example, a temperature of up to 160° C.

The laser power is varied appropriately in order for a continuous temperature rise to take place with a slight temperature gradient. The heating rate can be controlled in a pinpointed fashion.

Figure 2:
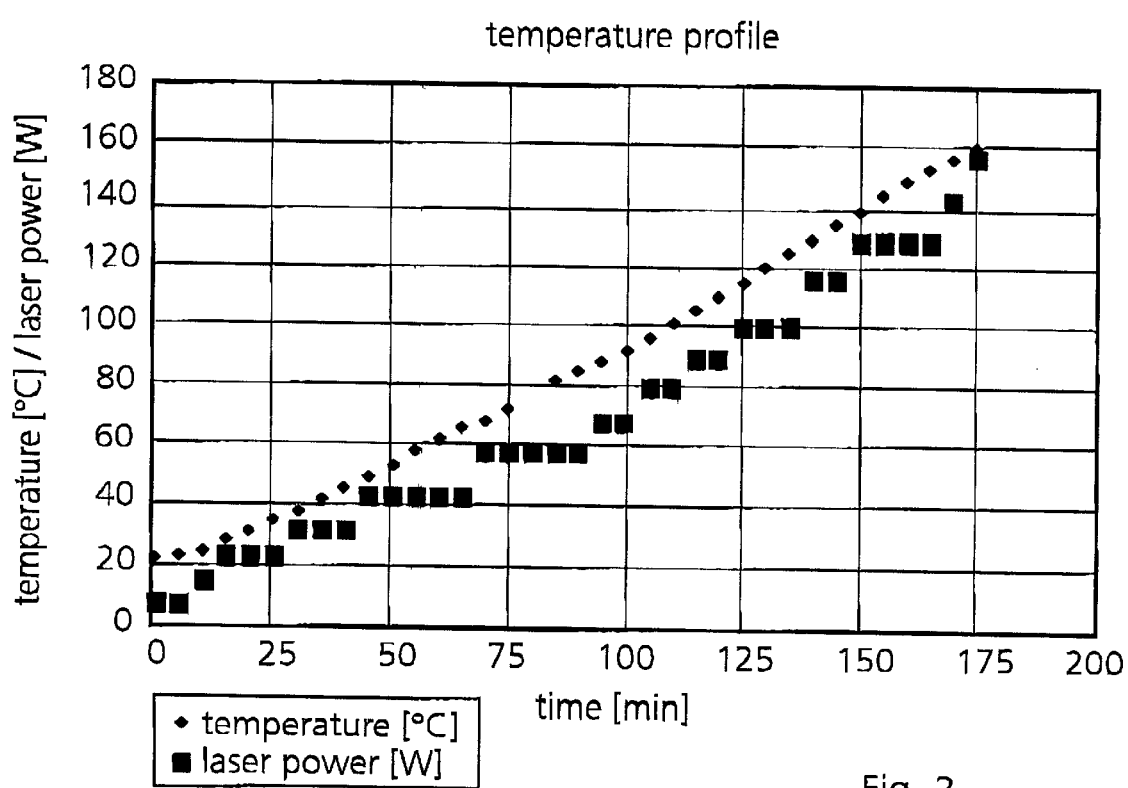
FIG. 2 shows a diagram relating to a heating process.

An example of a concave/convex lens with a diameter of 152 mm is illustrated for this purpose in FIG. 2. The abscissa shows the time profile in this case, while both the temperature in ° C. and the laser power in watts are given on the ordinate. In the example selected, the same numerical values are yielded by chance both for the temperature and for the laser power. In this case, the laser power is given by black squares, the temperature profile by points. The experiment is carried out in air, e.g. in atmosphere.

As may be seen, the temperature profile therefore runs virtually continuously from 20° up to 160° C. The laser power is increased in stages in order to achieve this profile, the stay at the various stages differing in length.

Of course, this thermal input with the given variation in the power of the laser 1 is to be regarded only by way of example. This can vary depending on the type and size of the lens. Likewise, a continuous rise is also possible for the variations in the laser power instead of stepped transitions.

The lens 3 is warmed up without contact, homogeneously and without material damage in the method described above.

Of course, the method described above with the aid of FIGS. 1 and 2 for heating calcium fluoride lenses by means of a $CO_2$ laser is also suitable for heating or warming up other materials in the said wavelength region. Likewise, instead of a $CO_2$ laser still other devices are suitable, which emit in the said wavelength region and whose beams are then used to heat corresponding materials.

Instead of a $Co_2$ laser, it is also possible, if appropriate, to use lead salt diode lasers which can be conceived on the basis of ternary, semiconducting compounds of the elements lead, tin, sulfur, selenium and tellurium, which are denoted as lead (-tin)-chalcogenides. Instead of a treatment of calcium fluoride, for example as lenses, further fluoride as well as oxide compounds are also possible such as, for example, $Na_2AlF_6$, $Na_5Al_2F_{14}$, $BaF_2$, $YF_2$, $YbF_3$, $DyF_3$, $LaF_3$, $NdF_2$, $PdF_2$, $CeO_2$, $TiO_2$, Zns. In particular, it is also possible to make use in optics of diverse fluoride compounds such as, for example, barium fluoride,

What is claimed is:

1. A method for heating a workpiece, which absorbs no radiation over a large IR wavelength region up to approximately 9 $\mu$m, or is optically transparent, comprising the step of heating by thermal radiation from radiation devices which emit beams in a wavelength region of greater than approximately 9 $\mu$m homogeneously over an entire facing surface of the workpiece.

2. The method as claimed in claim 1, wherein the heating is performed by thermal radiation with the aid of a laser.

3. The method as claimed in claim 1, wherein the workpiece is an optical element.

4. The method as claimed in claim 1, wherein the workpiece is a lens.

5. The method as claimed in claim 3, wherein the optical element is of calcium fluoride material.

6. The method as claimed in claim 4, wherein the lens is of calcium fluoride material.

7. The method for heating as claimed in claim 2, wherein a $CO_2$ laser is used as laser.

8. The method as claimed in claim 5, wherein the heating of the workpiece made from calcium fluoride material takes place in the transition region between an optical transparency and an optically absorbing region in a wavelength region from 9 to 12 $\mu$m.

9. The method as claimed in claim 6, wherein the heating of the workpiece made from calcium fluoride material takes place in the transition region between an optical transparency and an optically absorbing region in a wavelength region from 9 to 12 $\mu$m.

10. The method as claimed in claim 8, wherein the thermal radiation takes place in a wavelength region from 10 to 11 $\mu$m.

11. The method as claimed in claim 8, wherein the heating takes place by controlled warming.

12. The method as claimed in claim 9, wherein the heating takes place by controlled warming.

13. The method as claimed in claim 2, wherein the controlled warming is performed by varying the power of the laser.

14. The method as claimed in claim 13, wherein the laser power is varied in stages over the heating duration, the irradiation period of the individual stages being set differently in such a way as to produce a continuously rising temperature increase for the workpiece to be heated.

* * * * *